US009214300B2

(12) United States Patent
Chen

(10) Patent No.: US 9,214,300 B2
(45) Date of Patent: Dec. 15, 2015

(54) KEYBOARD DEVICE WITH LUMINOUS KEY

(71) Applicant: Primax Electronics Ltd., Neihu, Taipei (TW)

(72) Inventor: Chung-Yuan Chen, Taipei (TW)

(73) Assignee: PRIMAX ELECTRONICS LTD., Neihu (TW)

( * ) Notice: Subject to any disclaimer, the term of this patent is extended or adjusted under 35 U.S.C. 154(b) by 275 days.

(21) Appl. No.: 13/920,966

(22) Filed: Jun. 18, 2013

(65) Prior Publication Data

US 2014/0166456 A1 Jun. 19, 2014

(30) Foreign Application Priority Data

Dec. 19, 2012 (TW) ............................. 101148398 A

(51) Int. Cl.
*H01H 13/83* (2006.01)
*H01H 13/70* (2006.01)
*G06F 3/02* (2006.01)

(52) U.S. Cl.
CPC ......... *H01H 13/83* (2013.01); *H01H 2219/044* (2013.01); *H01H 2219/06* (2013.01)

(58) Field of Classification Search
CPC ......... H01H 13/83; H01H 13/704; G06F 3/02
USPC .......................... 200/5 A, 310–314, 341, 344
See application file for complete search history.

(56) References Cited

U.S. PATENT DOCUMENTS

| | | | | |
|---|---|---|---|---|
| 8,502,094 | B2 * | 8/2013 | Chen | 200/5 A |
| 2012/0080300 | A1 * | 4/2012 | Chen | 200/5 A |
| 2012/0090974 | A1 * | 4/2012 | Chen | 200/5 A |

* cited by examiner

*Primary Examiner* — Amy Cohen Johnson
*Assistant Examiner* — Marina Fishman
(74) *Attorney, Agent, or Firm* — Kirton McConkie; Evan R. Witt

(57) ABSTRACT

A keyboard device with a luminous key is provided. The keyboard device includes at least one luminous key, a light-emitting element, and a light shade, and a membrane switch circuit module. When the membrane switch circuit member is triggered by the at least one luminous key, the membrane switch circuit member generates at least one luminous key signal. The light-emitting element is used for emitting a light beam. The light shade is used for shading the light beam. Moreover, the light shade and the membrane switch circuit member are integrally formed with each other. Consequently, the light shade can be securely fixed on the membrane switch circuit module.

17 Claims, 10 Drawing Sheets

KEYBOARD DEVICE WITH LUMINOUS KEY

FIELD OF THE INVENTION

The present invention relates to a keyboard device, and more particularly to a keyboard device with a luminous key.

BACKGROUND OF THE INVENTION

Generally, the common input device of a computer system includes for example a mouse device, a keyboard device, a trackball device, or the like. Via the keyboard device, the user may input characters and symbols into the computer system. As a consequence, most users and most manufacturers of input devices pay much attention to the development of keyboard devices.

Hereinafter, the structures and the functions of a conventional keyboard device will be illustrated with reference to FIG. 1. FIG. 1 is a schematic view illustrating the outward appearance of a conventional keyboard device. As shown in FIG. 1, there are plural keys 10 and plural indicating lamps 11 on a surface of the conventional keyboard device 1. These keys 10 include ordinary keys, numeric keys, function keys, and the like. When one of these keys 10 is depressed by the user's finger, a corresponding signal is issued to the computer, and thus the computer executes a function corresponding to the depressed key. For example, when an ordinary key is depressed, a corresponding English letter or symbol is inputted into the computer. When a numeric key is depressed, a corresponding number is inputted into the computer. In addition, the function keys (F1~F12) can be programmed to provide various functions. The locations of the indicating lamps 11 correspond to the Caps lock key, the Number lock key and the Scroll lock key, respectively. In case that one of the Caps lock key, the Number lock key and the Scroll lock key is depressed, a corresponding specific function is enabled, and thus a corresponding indicating lamp 11 is turned on to result in a prompt. According to the illuminated indicating lamp, the user may realize that the corresponding one of the Caps lock key, the Number lock key and the Scroll lock key has been depressed and the corresponding function has been enabled. Since these indicating lamps 11 occupy additional layout space of the keyboard device 1, the indicating lamps become hindrance from reducing the volume of the keyboard device 1. Moreover, too many indicating lamps 11 may confuse the user. Under this circumstance, the user fails to accurately judge which key is correlated to the illuminated indicating lamp.

For solving the above drawbacks, a keyboard device with a luminous key is disclosed. FIG. 2 is a schematic cross-sectional view illustrating a conventional keyboard device with a luminous key. As shown in FIG. 2, the keyboard device 2 comprises a base 20, plural luminous keys 21, plural non-luminous keys 22, plural light-emitting elements 23, a membrane switch circuit member 24, and a plastic film layer 25. Each of the luminous keys 21 comprises a keycap 211 and an elastic element 212. Each of the non-luminous keys 22 comprises a keycap 221 and an elastic element 222. The keycap 211 of each luminous key 21 has a light-transmissible zone 2111. The plural light-emitting elements 23 are disposed on the membrane switch circuit member 24 and disposed under the light-transmissible zone 2111 of corresponding luminous keys 21. The plural light-emitting elements 23 are used for emitting plural light beams (not shown). The light beams may be transmitted through the light-transmissible zones 2111 of the luminous keys 21. The luminous keys 21 are specific function keys, which may be triggered to enable specific functions. For example, the luminous keys 21 includes the Caps lock key, the Number lock key, the Scroll lock key, and the like. Each of the luminous keys 21 further comprises a light shade 213 with an opening 2131. In addition, the corresponding light-emitting element 23 is partially enclosed by the light shade 213. Consequently, the light beams emitted by the light-emitting element 23 are only permitted to be transmitted through the opening 2131 of the light shade 213 without being scattered through the periphery of the light shade 213. As shown in FIG. 2, the light-emitting elements 23 are top-view light emitting diodes. In addition, the light shade 213 is made of a rubbery material.

The membrane switch circuit member 24 comprises an upper wiring board 241, a partition plate 242, and a lower wiring board 243. The upper wiring board 241 has plural upper contacts 2411 corresponding to the plural luminous keys 21 and the plural non-luminous keys 22. The partition plate 242 is disposed under the upper wiring board 241. In addition, the partition plate 242 has plural perforations 2421 corresponding to the plural upper contacts 2411. The lower wiring board 243 is disposed under the partition plate 242. In addition, the lower wiring board 243 has plural lower contacts 2431 corresponding to the plural perforations 2421. Each of the upper contacts 2411, the corresponding perforation 2421 and the corresponding lower contact 2431 are collectively defined as a key intersection 244. The plastic film layer 25 is disposed on the membrane switch circuit member 24. In addition, the plastic film layer 25 is coated with a black ink layer 251, so that the light beams are blocked by the plastic film layer 25. The base 20 is used for supporting the plural luminous keys 21, the plural non-luminous keys 22, the plural light-emitting elements 23, the membrane switch circuit member 24 and the plastic film layer 25.

When the keycap 211 of the luminous key 21 or the keycap 221 of the non-luminous key 22 is depressed by the user, the keycap 211 or 221 is moved downwardly to compress the elastic element 212 or 222, so that the corresponding upper contact 2411 is pushed by the elastic element 212 or 222. Consequently, the corresponding upper contact 2411 is inserted into the corresponding perforation 2421 to be contacted with the corresponding lower contact 2431. When the upper contact 2411 and the lower contact 2431 are contacted with each other, the corresponding key intersection 244 is electrically conducted, and thus a corresponding luminous key signal or a corresponding non-luminous key signal is generated. On the other hand, when the depressing force exerted on the keycap 211 or 221 is eliminated, an elastic force provided by the elastic element 212 or 222 is acted on the keycap 211 or 221. In response to the elastic force, the keycap 211 or 221 is moved upwardly and returned to an original position where the keycap 211 or 221 is not depressed.

In addition, when the keycap 211 of one of the luminous keys 21 is depressed and a corresponding luminous key signal is generated, the specific function corresponding to the depressed luminous key 21 is enabled. At the same time, the corresponding light-emitting element 23 is driven to emit a light beam in response to the luminous key signal. The light beam will be sequentially transmitted through the opening 2131 of the light shade 213 and the light-transmissible zone 2111 of the keycap 211. Since the light shade 213 has a function of centralizing the light beam, the intensity of the light beam outputted from the light-transmissible zone 2111 of the keycap 211 is increased to facilitate the user to realize whether the specific function corresponding to the depressed luminous key 21 is enabled.

Since the light shades 213 of the luminous keys 21 are attached on the plastic film layer 25 by adhesion, some drawbacks may possibly occur. For example, during the process of attaching the light shade 213 on the plastic film layer 25, if the light shade 213 is suffered from misalignment, the opening 2131 of the light shade 213 fails to be aligned with the light-emitting element 23. Under this circumstance, only a portion of the light beam from the light-emitting element 23 is transmitted through the opening 2131 of the light shade 213. Whereas, the remaindering portion of the light beam from the light-emitting element 23 is blocked by the light shade 213. Consequently, the illuminating efficacy of the luminous key 21 is insufficient for the user to identify whether the luminous key 21 is illuminated. In addition, an assembling error is readily generated during the process of assembling the light shade 213 and the plastic film layer 25. Consequently, after the keyboard 2 is produced, the light shade 213 is easily detached. If the light shade 213 is detached, the light beam emitted by the light-emitting element 23 will be scattered everywhere because the light beam is no longer centralized by the light shade 213. Under this circumstance, the illuminating efficacy of the luminous key 21 is still insufficient.

For solving the above drawbacks, another keyboard device with a luminous key is introduced into the market. This keyboard device is equipped with a backlight module for emitting a light beam and guiding the light beam to an additional light-outputting zone of the keycap. For example, the additional light-outputting zone is a character region or a symbol region of the keycap. By means of the backlight module, the light beam can be directed to the additional light-outputting zone of the keycap in order to illuminate the character or the symbol. However, for preventing from light leakage, the backlight module should be equipped with a light shade, and the light shade should be securely fixed.

SUMMARY OF THE INVENTION

The present invention provides a keyboard device with a luminous key, in which the light shade of the keyboard device can be securely fixed.

In accordance with an aspect of the present invention, there is provided a keyboard device. The keyboard device includes at least one luminous key, a membrane switch circuit member, at least one first light-emitting element, and a first light shade. The at least one luminous key is exposed to a top surface of the keyboard device. Each of the at least one luminous key has a first light-outputting zone. The membrane switch circuit member is disposed under the at least one luminous key. When the membrane switch circuit member is triggered by the at least one luminous key, the membrane switch circuit member generates at least one luminous key signal. The at least one first light-emitting element is disposed under the at least one luminous key for emitting at least one first light beam. The at least first light beam is directed to the corresponding first light-outputting zone. The first light shade is connected with the membrane switch circuit member, and disposed under the at least one luminous key for shading the at least first light beam. The first light shade and the membrane switch circuit member are integrally formed with each other.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
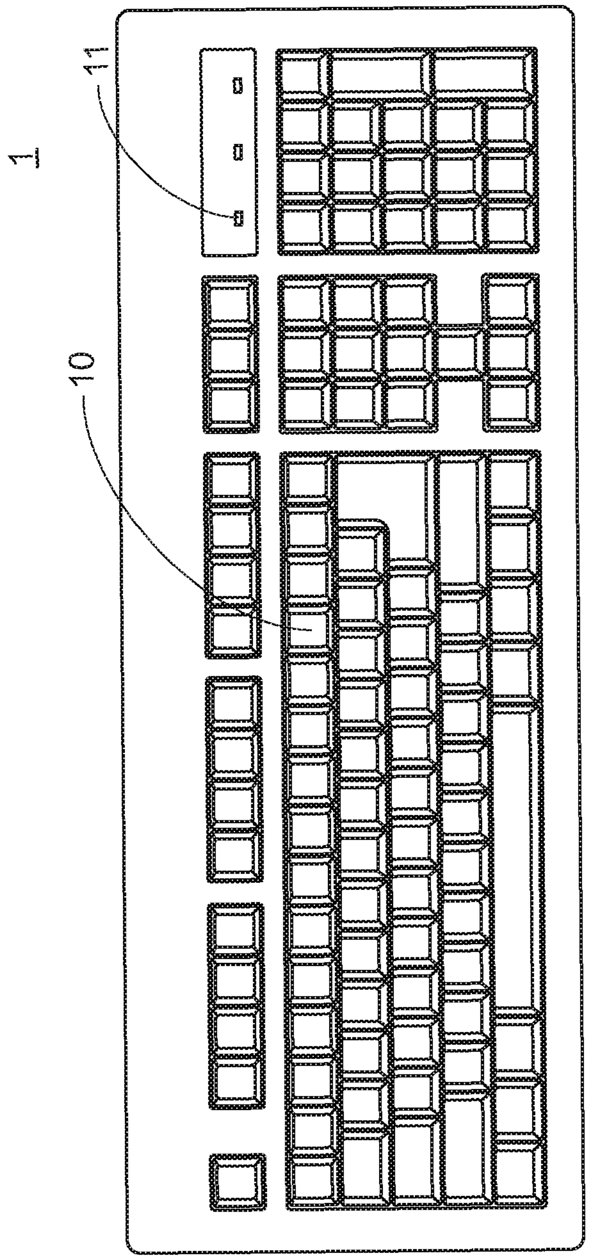
FIG.1 PRIOR ART
FIG. 1 is a schematic view illustrating the outward appearance of a conventional keyboard device.
Figure 2:
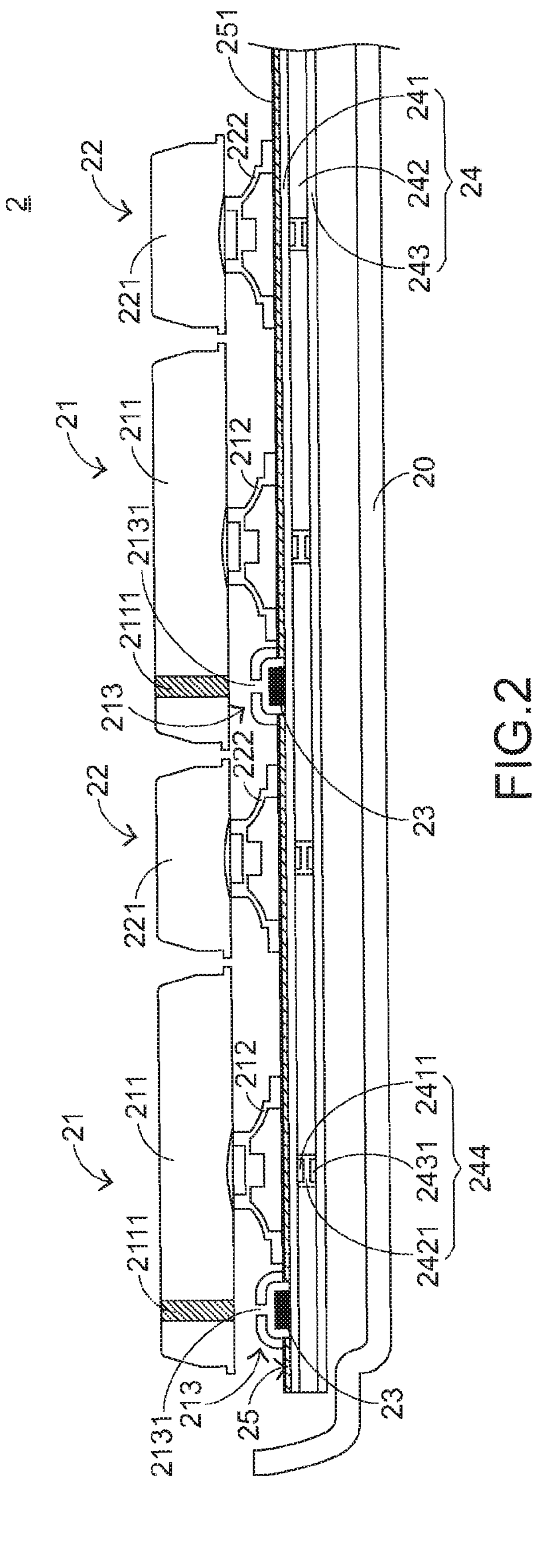
FIG.2 PRIOR ART
FIG. 2 is a schematic cross-sectional view illustrating a conventional keyboard device with a luminous key.
Figure 3:
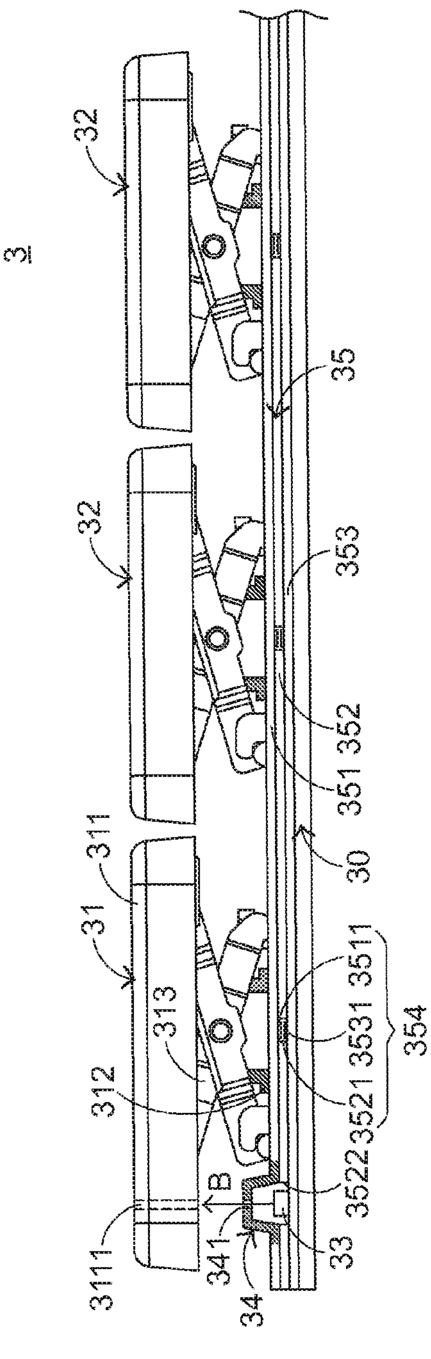
FIG. 3 is a schematic view illustrating a keyboard device with a luminous key according to a first embodiment of the present invention.

FIG. 3 is a schematic view illustrating a keyboard device with a luminous key according to a first embodiment of the present invention. As shown in FIG. 3, the keyboard device 3 comprises a supporting plate 30, at least one luminous key 31, plural non-luminous keys 32, at least one light-emitting element 33, at least one light shade 34, and a membrane switch circuit member 35. The supporting plate 30 is disposed under the membrane switch circuit member 35 for supporting the at least one luminous key 31, the plural non-luminous keys 32 and the membrane switch circuit member 35. The at least one luminous key 31 comprises at least one keycap 311, at least one elastic element 312, and at least one connecting element 313. The at least one keycap 311 has a light-outputting zone 3111. The at least one elastic element 312 is disposed under the at least one keycap 311. Moreover, the at least one elastic element 312 is contacted with the at least one keycap 311 for providing an elastic force to the at least one keycap 311. The at least one connecting element 313 is arranged between the supporting plate 30 and the at least one keycap 311. The at least one connecting element 313 is used for connecting the supporting plate 30 and the at least one keycap 311 and allowing the at least one keycap 311 to be moved upwardly or downwardly relative to the supporting plate 30. In this embodiment, the light-outputting zone 3111 is an indicating lamp cover, and the connecting element 313 is a scissors-type connecting element.

The membrane switch circuit member 35 is disposed under the at least one elastic element 312. Moreover, the membrane switch circuit member 35 has at least one key intersection 354 corresponding to the at least one luminous key 31. In this embodiment, the membrane switch circuit member 35 comprises an upper wiring board 351, a partition plate 352, and a lower wiring board 353. The upper wiring board 351 has at least one upper contact 3511. The partition plate 352 is disposed under the upper wiring board 351. In addition, the partition plate 352 has at least one first perforation 3521 corresponding to the at least one upper contact 3511. When the membrane switch circuit member 35 is depressed, the at least one upper contact 3511 is inserted into the at least one first perforation 3521. The lower wiring board 353 is disposed under the partition plate 352. In addition, the lower wiring board 353 has at least one lower contact 3531 corresponding to the at least one upper contact 3511. The at least one upper contact 3511, the at least one first perforation 3521 and the at least one lower contact 3531 are collectively defined as the at least one key intersection 354. When the at least one keycap 311 is depressed by the user, the at least one connecting element 313 is correspondingly switched to a folded state. Consequently, the at least one keycap 311 is moved downwardly relative to the supporting plate 30, and the at least one elastic element 312 is depressed and compressed by the at least one keycap 311. Under this circumstance, since the at least one key intersection 354 of the membrane switch circuit member 35 is pushed by the at least one elastic element 312, the at least one key intersection 354 is triggered to generate a corresponding luminous key signal. On the other hand, when the depressing force exerted on the at least one keycap 311 is eliminated, an elastic force provided by the at least one elastic element 312 is acted on the at least one keycap 311. In response to the elastic force, the at least one keycap 311 is returned to an original position. The operating principles of depressing the non-luminous key 32 are substantially identical to those of the luminous key 31, and are not redundantly described herein.

The at least one light-emitting element 33 is disposed on the lower wiring board 353 of the membrane switch circuit member 35 and disposed under the light-outputting zone 3111 for emitting at least one light beam B. The light beam B is transmitted through the light-outputting zone 3111. In this embodiment, the light-emitting element 33 is a top-view light emitting diode. The at least one light shade 34 is connected with the membrane switch circuit member 35, and disposed over the light-emitting element 33. The at least one light shade 34 has a light-outputting part 341. The at least one light beam B is shaded by the at least one light shade 34. However, the at least one light beam B can be transmitted through the corresponding light-outputting part 341, and directed to the light-outputting zone 3111. In this embodiment, the at least one light shade 34 and the upper wiring board 351 of the membrane switch circuit member 35 are integrally formed with each other. In an embodiment, a method of producing the light shade 34 comprises the steps of punching the upper wiring board 351 to form a convex structure, and opacifying the convex structure. Moreover, the light-outputting part 341 of the light shade 34 is an opening. Except that the elastic element of the non-luminous key 32 is not connected with the light shade 34 and the keycap of the non-luminous key 32 does not have the first light-outputting zone, the other structures of the non-luminous key 32 are substantially identical to those of the luminous key 31, and are not redundantly described herein.

Please refer to FIG. 3 again. The partition plate 352 further comprises at least one second perforation 3522. The at least one second perforation 3522 is disposed under the at least one light shade 34. The light-emitting element 33 is disposed on the lower wiring board 353, and inserted into the second perforation 3522. The upper wiring board 351 is light-transmissible for allowing the light beam B to go through. Consequently, the light beam B from the light-emitting element 33 can be transmitted through the second perforation 3522 and the light-outputting part 341, and directed to the light-outputting zone 3111. Under this circumstance, the user can identify whether a specific function corresponding to the luminous key 31 is enabled by naked eyes according to the illuminating status of the light-outputting zone 3111. In this embodiment, the upper wiring board 351 is made of a light-transmissible material, so that the light beam B is transmitted through the upper wiring board 351. An example of the light-transmissible material includes but is not limited to polyethylene terephthalate (PET), polycarbonate (PC) or polymethylmethacrylate (PMMA).

In the above embodiment, the at least one light-emitting element 33 is electrically connected with the trace pattern of the lower wiring board 353. For clarification and brevity, the trace pattern of the lower wiring board 353 is not shown in the drawings. Moreover, the second perforation 3522 of the partition plate 352 is used for accommodating the light-emitting element 33. If the light-emitting element has a larger size, the upper wiring board further comprises an additional perforation corresponding to the light-emitting element in order to facilitate accommodating the light-emitting element. Moreover, the elastic element 312 of this embodiment is made of an opaque rubbery material, and each elastic element 312 is aligned with one corresponding keycap 311 in a one-by-one arrangement. Moreover, the upper wiring board 351 is made of a light-transmissible material, but the light shade 34 (or the convex structure) of the upper wiring board 351 is opacified. Consequently, the light shade 34 is capable of shading the light beam B.

From the above discussions, after the above components are combined together, the keyboard device 3 with the luminous key 31 is produced. When the luminous key 31 is depressed, the key intersection 354 of the membrane switch circuit member 35 is triggered to generate the luminous key signal. At the same time, the light-emitting element 33 is driven to emit the light beam B in response to the luminous key signal. Since the light beam B is transmitted through the light-outputting part 341 of the light shade 34, the light beam B is centralized to be directed to the light-outputting zone 3111 of the keycap 311. Under this circumstance, the possibility of scattering and leaking the light beam B will be minimized.

Figure 4:
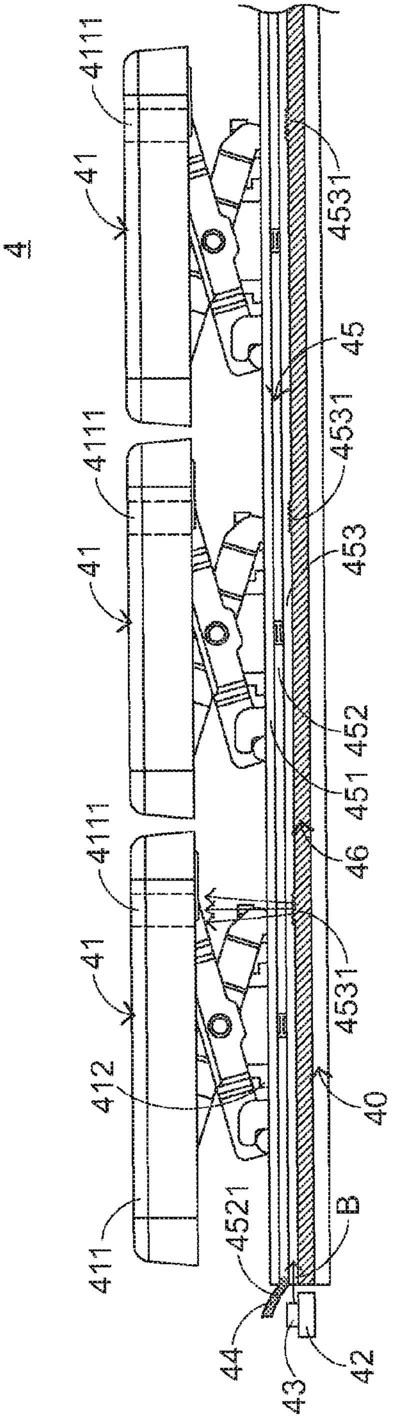
FIG. 4 is a schematic view illustrating a keyboard device with a luminous key according to a second embodiment of the present invention.

The present invention further provides a keyboard device of a second embodiment. FIG. 4 is a schematic view illustrating a keyboard device with a luminous key according to a second embodiment of the present invention. As shown in FIG. 4, the keyboard device 4 comprises a supporting plate 40, at least one luminous key 41, a flexible circuit board 42, at least one light-emitting element 43, at least one light shade 44, a membrane switch circuit member 45, and a reflector 46. Except for the following two items, the structures of the keyboard device 4 of this embodiment are substantially identical to those of the keyboard device 3 of the first embodiment, and are not redundantly described herein.

Figure 5:
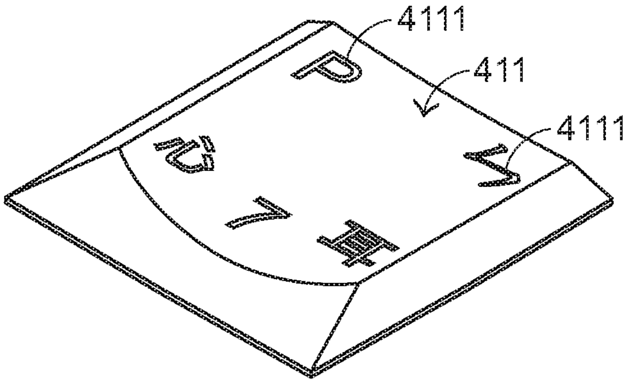
FIG. 5 is a schematic view illustrating a keycap of the luminous key of the keyboard device according to the second embodiment of the present invention.

Firstly, the keyboard device 4 of this embodiment further comprises the flexible circuit board 42. The flexible circuit board 42 is located at a side of the membrane switch circuit member 45. The flexible circuit board 42 is electrically connected with a keyboard circuit board (not shown) for receiving electricity from the keyboard circuit board. The at least one light-emitting element 43 is disposed on the flexible circuit board 42. In this embodiment, the light-emitting element 43 is a side-view light-emitting diode. Secondly, the at least one light-outputting zone 4111 of the at least one keycap 411 of the at least one luminous key 41 is a laser-engraved light-transmissible zone with a laser-engraved character or a laser-engraved symbol. In other words, the light-outputting zone 4111 is not an indicating lamp cover. An example of the first light-outputting zone 4111 of the at least one keycap 411 is schematically shown in FIG. 5. In this embodiment, the at least one elastic element 412 of the at least one luminous key 41 is made of a light-transmissible plastic material, so that the light beam B from the at least one light-emitting element 43 can be transmitted through the at least one elastic element 412.

The at least one light shade 44 is connected with the membrane switch circuit member 45, and disposed over the at least one light-emitting element 43. The light beam B from the at least one light-emitting element 43 is shaded by the at least one light shade 44. In this embodiment, the light shade 44 and a partition plate 452 of the membrane switch circuit member 45 are integrally formed with each other. Moreover, a method of producing the at least one light shade 44 comprises the steps of bending an edge 4521 of the partition plate 452 to form a convex structure, and opacifying the convex structure.

In this embodiment, a lower wiring board 453 of the membrane switch circuit member 45 has plural light-guiding structures 4531 for guiding the light beam B to the light-outputting zone 4111. In this embodiment, each of the light-guiding structures 4531 is a V-cut microstructure, a texturing structure, or a light-guiding ink layer. That is, in this embodiment, the lower wiring board 453 of the membrane switch circuit member 45 is also used as a light guide plate. Consequently, it is not necessary to install an additional light guide plate on the keyboard device 4 of this embodiment. Moreover, the keyboard device 4 of this embodiment further comprises the reflector 46. The reflector 46 is disposed under the membrane switch circuit member 45 for reflecting the at least one light beam B. The at least one light beam B is directed to the light-outputting zone 4111 through the light-guiding structures 4531 of the lower wiring board 453.

For allowing the light beam B to be transmitted through the membrane switch circuit member 45 and directed to the light-outputting zone 4111, all of an upper wiring board 451, the partition plate 452 and the lower wiring board 453 are made of a light-transmissible material, so that the first light beam B1 is permitted to go through. An example of the light-transmissible material includes but is not limited to polyethylene terephthalate (PET), polycarbonate (PC) or polymethylmethacrylate (PMMA).

From the above discussions, after the above components are combined together, the keyboard device 4 with the luminous key 41 is produced. When the light beam B is emitted by the at least one light-emitting element 43, the light beam B is directed to the light-outputting zone 4111 of the keycap 411 in order to illuminate the laser-engraved character or the laser-engraved symbol.

Figure 6:
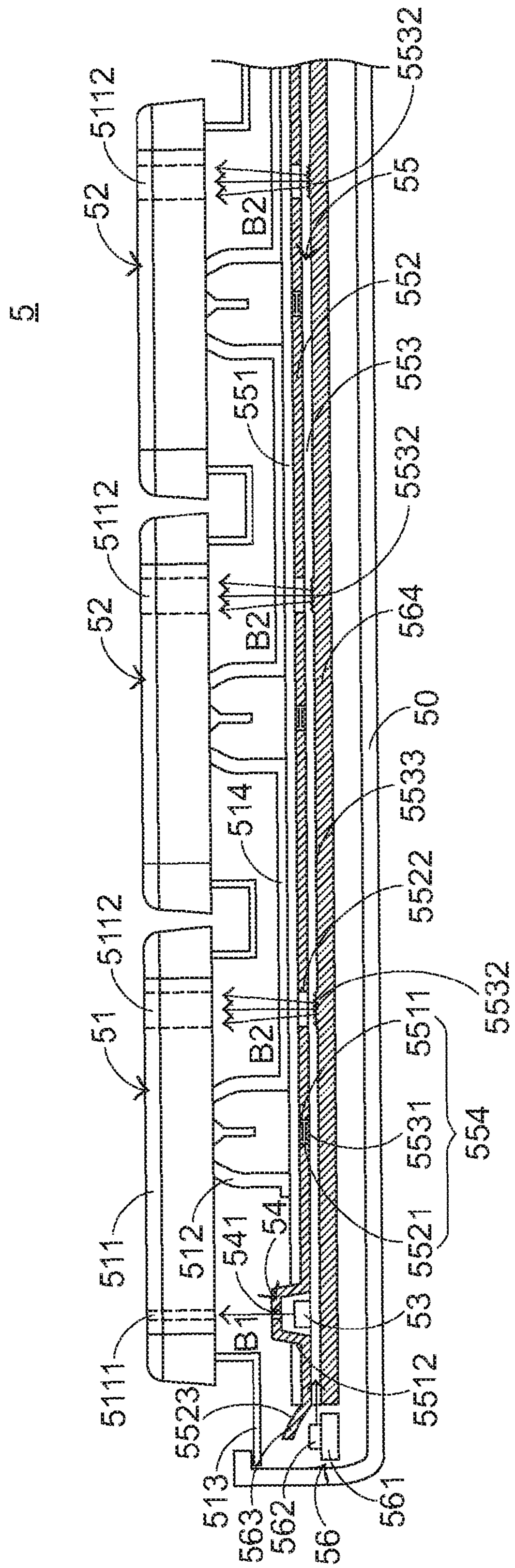
FIG. 6 is a schematic view illustrating a keyboard device with a luminous key according to a third embodiment of the present invention.
Figure 7:
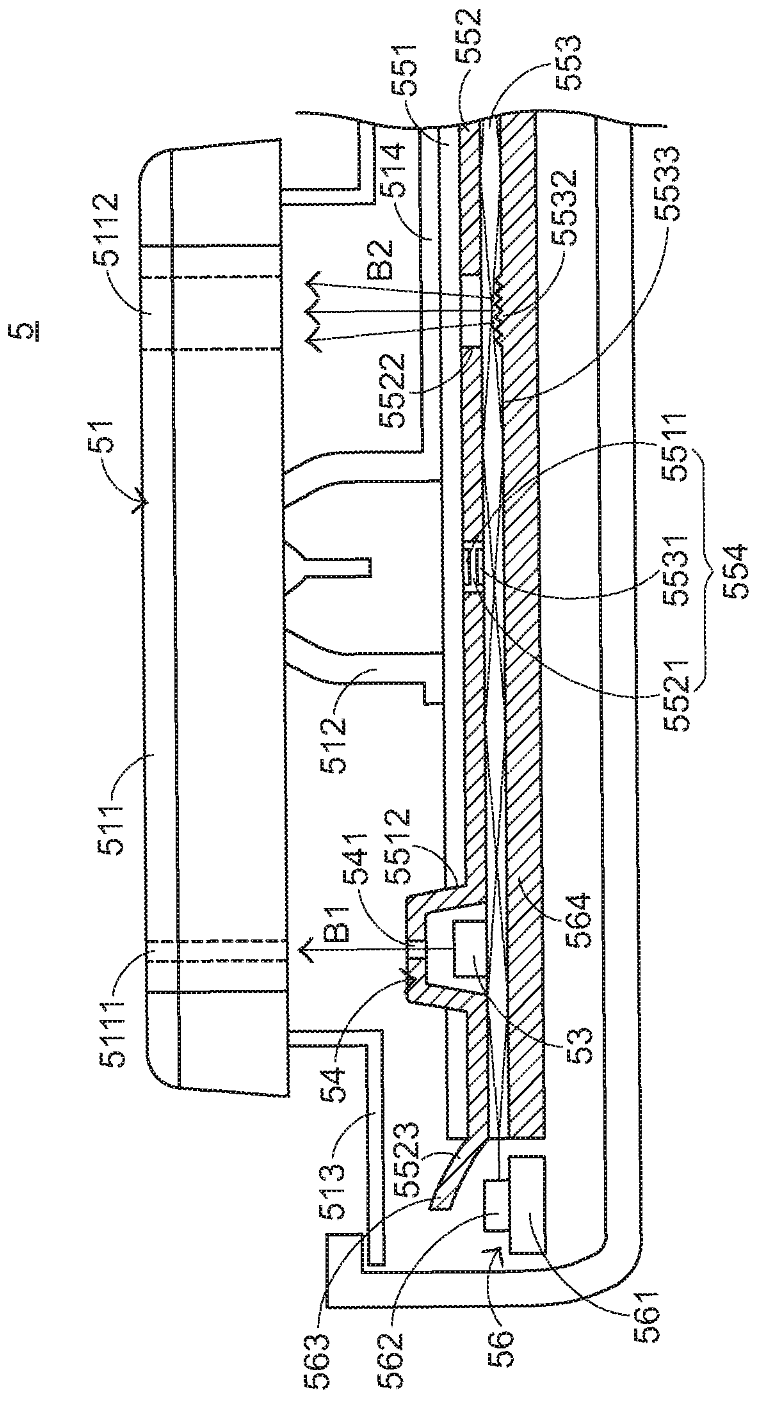
FIG. 7 is a schematic view illustrating a luminous key of the keyboard device according to the third embodiment of the present invention.

The present invention further provides a keyboard device of a third embodiment. FIG. 6 is a schematic view illustrating a keyboard device with a luminous key according to a third embodiment of the present invention. FIG. 7 is a schematic view illustrating a luminous key of the keyboard device according to the third embodiment of the present invention. As shown in FIGS. 6 and 7, the keyboard device 5 comprises a base 50, at least one first luminous key 51, plural second luminous keys 52, at least one first light-emitting element 53, at least one light shade 54, a membrane switch circuit member 55, and a backlight module 56. The base 50 is disposed under the membrane switch circuit member 55 and the backlight module 56 for supporting the at least one first luminous key 51, the plural second luminous keys 52, the membrane switch circuit member 55 and the backlight module 56.

Figure 8:
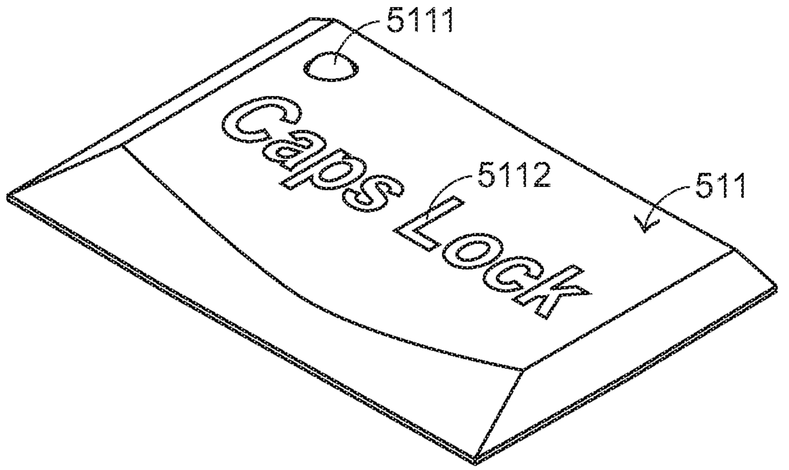
FIG. 8 is a schematic view illustrating a keycap of the first luminous key of the keyboard device according to the third embodiment of the present invention.

The at least one first luminous key 51 comprises at least one keycap 511, at least one elastic element 512, and at least one key housing 513. The at least one keycap 511 comprises a first light-outputting zone 5111 and at least one second light-outputting zone 5112. In this embodiment, the first light-outputting zone 5111 is an indicating lamp cover, and the at least one second light-outputting zone 5112 is a laser-engraved light-transmissible zone with a laser-engraved character or a laser-engraved symbol. Examples of the first light-outputting zone 5111 and the second light-outputting zone 5112 are schematically shown in FIG. 8. The at least one elastic element 512 is disposed under the at least one keycap 511. Moreover, the at least one elastic element 512 is contacted with the at least one keycap 511 for providing an elastic force to the at least one keycap 511. In this embodiment, plural elastic elements 512 are disposed on an elastic layer 514. That is, the plural elastic elements 512 and elastic layer 514 are integrally formed with each other. The at least one key housing 513 is arranged between the base 50 and the at least one keycap 511 for supporting the at least one keycap 511.

The membrane switch circuit member 55 is disposed under the at least one elastic element 512. Moreover, the membrane switch circuit member 55 has at least one key intersection 554 corresponding to the at least one first luminous key 51 or the at least one second luminous key 52. In this embodiment, the membrane switch circuit member 55 comprises an upper wiring board 551, a partition plate 552, and a lower wiring board 553. The upper wiring board 551 has at least one upper contact 5511. The partition plate 552 is disposed under the upper wiring board 551. In addition, the partition plate 552 has at least one first perforation 5521 corresponding to the at least one upper contact 5511. When the membrane switch circuit member 55 is depressed, the at least one upper contact 5511 is inserted into the at least one first perforation 5521. The lower wiring board 553 is disposed under the partition plate 552. In addition, the lower wiring board 553 has at least one lower contact 5531 corresponding to the at least one upper contact 5511. The at least one upper contact 5511, the at least one first perforation 5521 and the at least one lower contact 5531 are collectively defined as the at least one key intersection 554. In this embodiment, the upper wiring board 551 further comprises at least one third perforation 5512, the partition plate 552 further comprises plural second perforations 5522, and the lower wiring board 553 further comprises plural light-guiding structures 5532. The plural light-guiding structures 5532 are formed on a bottom surface 5533 of the lower wiring board 553.

When the at least one keycap 511 is depressed by the user, the at least one keycap 511 is moved downwardly relative to the supporting plate 50, and the at least one elastic element 512 is depressed and compressed by the at least one keycap 511. Under this circumstance, since the at least one key intersection 554 of the membrane switch circuit member 55 is pushed by the at least one elastic element 512, the at least one key intersection 554 is triggered to generate a corresponding luminous key signal. On the other hand, when the depressing force exerted on the at least one keycap 511 is eliminated, an elastic force provided by the at least one elastic element 512 is acted on the at least one keycap 511. In response to the elastic force, the at least one keycap 511 is returned to an original position. The second luminous key 52 only comprises the second light-outputting zone 5112, and does not have the first light-outputting zone 5111. The other structures of the second luminous key 52 are substantially identical to those of the luminous key 51. The operating principles of depressing the second luminous key 52 are substantially identical to those of the luminous key 51, and are not redundantly described herein.

The at least one first light-emitting element 53 is disposed on the lower wiring board 553 of the membrane switch circuit member 55 and disposed under the first light-outputting zone 5111 for emitting a first light beam B 1. The first light beam B1 is transmitted through the first light-outputting zone 5111. In this embodiment, the at least one first light-emitting element 53 is a top-view light emitting diode.

The at least one light shade 54 is connected with the partition plate 552 of the membrane switch circuit member 55, and inserted into the at least one third perforation 5512 of the upper wiring board 551. Each light shade 54 has a light-outputting part 541. The first light beam B1 is shaded by the at least one light shade 54. However, the first light beam B1 can be transmitted through the light-outputting part 541, and directed to the first light-outputting zone 5111. In this embodiment, the at least one light shade 54 and the partition plate 552 of the membrane switch circuit member 55 are integrally formed with each other. In an embodiment, the at least one light shade 54 is produced by punching the partition plate 552 to form a convex structure. Moreover, the light-outputting part 541 of the at least one light shade 54 is light-transmissible zone. Especially, in this embodiment, the partition plate 552 is a reflector with the at least one first perforation 5521, so that the partition plate 552 is capable of reflecting the light beam. In other words, the at least one light shade 54, which is integrally formed with the partition plate 552, has the light-shading function without the need of opacifying the convex structure. Alternatively, a reflective ink layer may be formed on a top surface or a bottom surface of the partition plate. Due to the reflective ink layer, the partition plate has the ability of reflecting the light beam.

The backlight module 56 is disposed under the at least one first luminous key 51 and the plural second luminous keys 52 for emitting at least one second light beam B2 and allowing the at least one second light beam B2 to be transmitted through the at least one second light-outputting zone 5112 of the at least one keycap 511. In this embodiment, the at least one elastic element 512 is made of a light-transmissible plastic material, so that the at least one second light beam B2 can be transmitted through the at least one elastic element 512 and directed to the at least one second light-outputting zone 5112. In this embodiment, the backlight module 56 comprises a flexible circuit board 561, at least one second light-emitting element 562, another light shade 563, and another reflector 564. The flexible circuit board 561 is connected with the membrane switch circuit member 55. The at least one second light-emitting element 562 is disposed on the flexible circuit board 561 and located near the lower wiring board 553 for emitting the at least one second light beam B2. In this embodiment, the second light-emitting element 562 is a side-view light-emitting diode. By acquiring electricity from the membrane switch circuit member 55, the flexible circuit board 561 is enabled to drive illumination of the at least one second light-emitting element 562.

In this embodiment, the lower wiring board 553 is also used as a light guide plate. Consequently, the at least one second light beam B2 is guided to the second light-outputting zone 5112 by the plural light-guiding structures 5532 of the lower wiring board 553. In this embodiment, the light-guiding structures 5532 are V-cut microstructures. Alternatively, in some other embodiments, the light-guiding structures are texturing structures, or the light-guiding structures are produced by forming a layer of light-guiding ink. When the at least one second light beam B2 is emitted by the at least one second light-emitting element 562, the at least one second light beam B2 is introduced into the lower wiring board 553 through the plural light-guiding structures 5532, and transmitted to the plural second perforations 5522 of the partition plate 552. Consequently, the at least one second light beam B2 is sequentially transmitted through the membrane switch circuit member 55 and the at least one elastic element 512, and directed to the at least one second light-outputting zone 5112.

In the backlight module 56, the light shade 563 is connected with the membrane switch circuit member 55 for shading the at least one second light beam B2. In this embodiment, the light shade 563 and the partition plate 552 of the membrane switch circuit member 55 are integrally formed with each other. In an embodiment, the light shade 563 is produced by bending an edge 5523 of the partition plate 552 to form an additional convex structure 5523. Since the partition plate 552 has the light-reflecting function, it is not necessary to opacify the additional convex structure 5523. In other words, the light shade 54 and the light shade 563 are integrally formed with the partition plate 552.

The reflector 564 is disposed under the lower wiring board 553. The portion of the at least one second light beam B2 which is not transmitted through the plural light-guiding structures 5532 will be reflected by the reflector 564. Consequently, the at least one second light beam B2 is introduced into the lower wiring board 553 again and directed to the second light-outputting zone 5112 through the plural light-guiding structures 5532. Under this circumstance, the utilization efficacy of the light beam is enhanced. On the other hand, since the partition plate 552 also has the light-reflecting function, the at least one second light beam B2 can be reflected by the partition plate 552. Under this circumstance, the utilization efficacy of the light beam is further enhanced.

For allowing the at least one second light beam B2 to be transmitted through the membrane switch circuit member 55 and directed to the second light-outputting zone 5112, both of the upper wiring board 551 and the lower wiring board 553 are made of a light-transmissible material. An example of the light-transmissible material includes but is not limited to polyethylene terephthalate (PET), polycarbonate (PC) or polymethylmethacrylate (PMMA).

From the above discussions, after the above components are combined together, the keyboard device 5 with the luminous key 51 is produced. When the luminous key 51 is depressed, the key intersection 554 of the membrane switch circuit member 55 is triggered to generate the luminous key signal. At the same time, the at least one first light-emitting element 53 is driven to emit the at least one first light beam B1 in response to the luminous key signal. Since the at least one first light beam B1 is transmitted through the light-outputting part 541, the at least one first light beam B1 is centralized to be directed to the first light-outputting zone 5111 of the keycap 511 in order to illuminate the keycap 511. On the other hand, the at least one second light-emitting element 562 is used for emitting the at least one second light beam B2. The at least one second light beam B2 is guided to the second light-outputting zone 5112 of the keycap 511 by the lower wiring board 553 in order to illuminate the laser-engraved character or the laser-engraved symbol of the second light-outputting zone 5112. Especially, due to the arrangement of the light shade 54 and the light shade 563, the first light beam B1 and the second light beam B2 are properly isolated from each other without being mixed.

Figure 9:
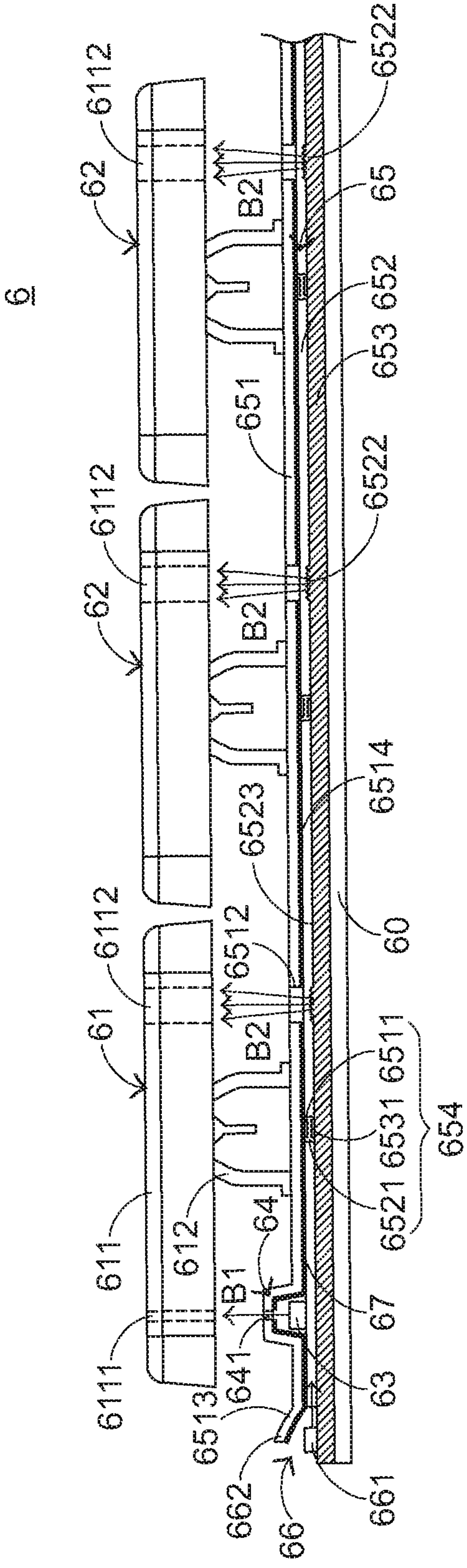
FIG. 9 is a schematic view illustrating a keyboard device with a luminous key according to a fourth embodiment of the present invention.
Figure 10:
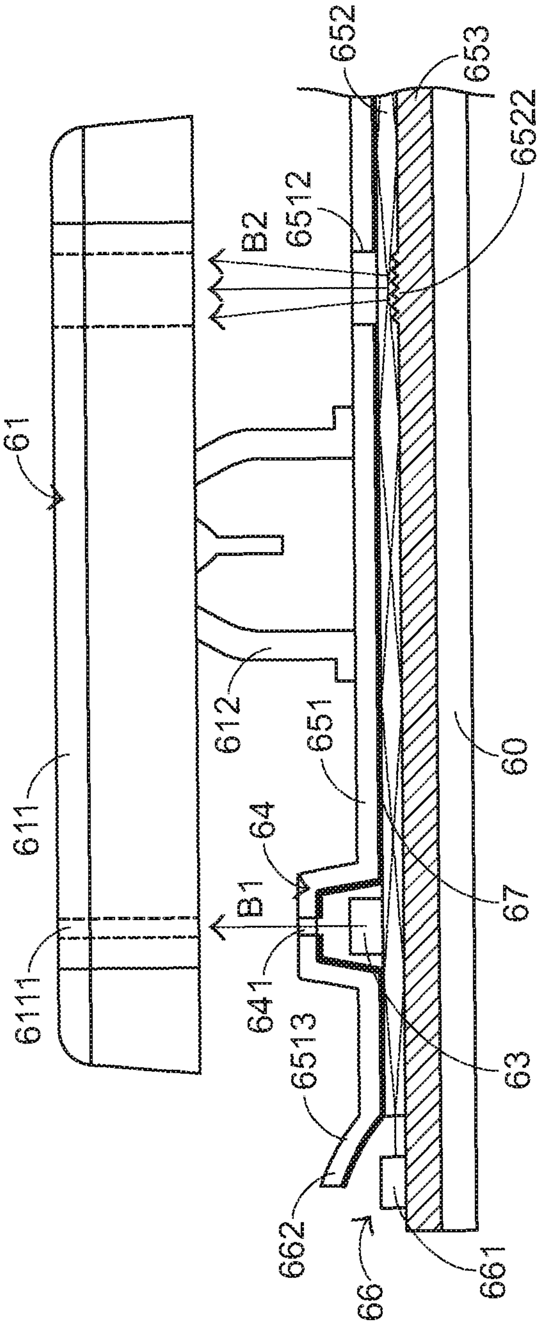
FIG. 10 is a schematic partial view illustrating the keyboard device according to the fourth embodiment of the present invention.

The present invention further provides a keyboard device of a fourth embodiment. FIG. 9 is a schematic view illustrating a keyboard device with a luminous key according to a fourth embodiment of the present invention. FIG. 10 is a schematic partial view illustrating the keyboard device according to the fourth embodiment of the present invention. As shown in FIGS. 9 and 10, the keyboard device 6 comprises a supporting plate 60, at least one first luminous key 61, plural second luminous keys 62, at least one first light-emitting element 63, at least one light shade 64, a membrane switch circuit member 65, and a backlight module 66. The supporting plate 60 is disposed under the membrane switch circuit member 65 and the backlight module 66 for supporting the at least one first luminous key 61, the plural second luminous keys 62, the membrane switch circuit member 65 and the backlight module 66.

Figure 11:
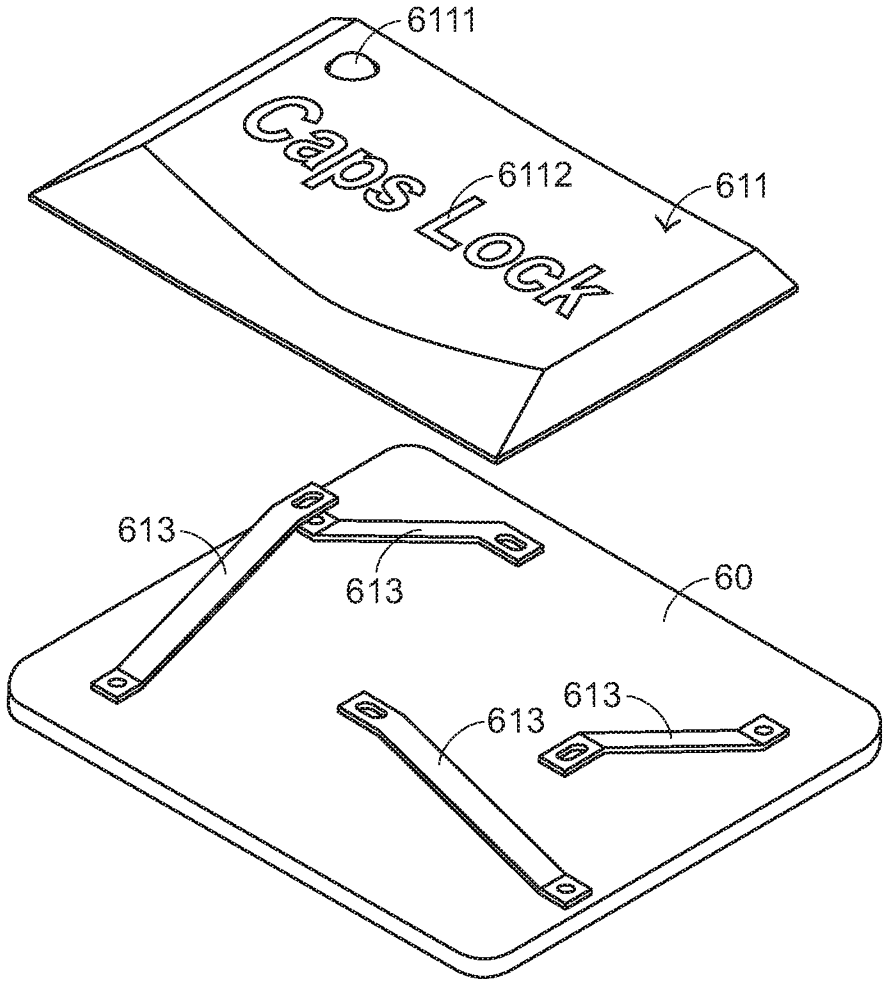
FIG. 11 is a schematic partial exploded view illustrating the keyboard device according to the fourth embodiment of the present invention.

FIG. 11 is a schematic partial exploded view illustrating the keyboard device according to the fourth embodiment of the present invention. Please refer to FIGS. 10 and 11. The at least one first luminous key 61 comprises at least one keycap 611, at least one elastic element 612, and at least one connecting element 613. The at least one keycap 611 has a first light-outputting zone 6111 and a second light-outputting zone 6112. The at least one elastic element 612 is disposed under the at least one keycap 611. Moreover, the at least one elastic element 612 is contacted with the at least one keycap 611 for providing an elastic force to the at least one keycap 611. The at least one connecting element 613 is arranged between the supporting plate 60 and the at least one keycap 611. The at least one connecting element 613 is used for connecting the supporting plate 60 and the at least one keycap 611 and allowing the at least one keycap 611 to be moved upwardly and downwardly relative to the supporting plate 60. In this embodiment, the first light-outputting zone 6111 is an indicating lamp cover, the second light-outputting zone 6112 is a laser-engraved light-transmissible zone with a laser-engraved character or a laser-engraved symbol, and the connecting element 613 is an elastic arm.

The membrane switch circuit member 65 is disposed under the at least one elastic element 612. Moreover, the membrane switch circuit member 65 has at least one key intersection 654 corresponding to the at least one first luminous key 61 or the at least one second luminous key 62. In this embodiment, the membrane switch circuit member 65 comprises an upper wiring board 651, a partition plate 652, and a lower wiring board 653. The upper wiring board 651 has at least one upper contact 6511. The partition plate 652 is disposed under the upper wiring board 651. In addition, the partition plate 652 has at least one first perforation 6521 corresponding to the at least one upper contact 6511. When the membrane switch circuit member 65 is depressed, the at least one upper contact 6511 is inserted into the at least one first perforation 6521. The lower wiring board 653 is disposed under the partition plate 652. In addition, the lower wiring board 653 has at least one lower contact 6531 corresponding to the at least one upper contact 6511. The at least one upper contact 6511, the at least one first perforation 6521 and the at least one lower contact 6531 are collectively defined as the at least one key intersection 654. In this embodiment, the upper wiring board 651 further comprises plural light-transmissible zones 6512, and the partition plate 652 further comprises plural light-guiding structures 6522. The plural light-guiding structures 6522 are formed on a bottom surface 6523 of the partition plate 652.

When the at least one keycap 611 is depressed by the user, the at least one connecting element 613 is correspondingly switched to a folded state. Consequently, the at least one keycap 611 is moved downwardly relative to the supporting plate 60, and the at least one elastic element 612 is depressed and compressed by the at least one keycap 611. Under this circumstance, since the at least one key intersection 654 is pushed by the at least one elastic element 612, the at least one key intersection 654 is triggered to generate a corresponding luminous key signal. On the other hand, when the depressing force exerted on the at least one keycap 611 is eliminated, an elastic force provided by the at least one elastic element 612 is acted on the at least one keycap 611. In response to the elastic force, the at least one keycap 611 is returned to an original position.

The at least one first light-emitting element 63 is disposed on the partition plate 652 of the membrane switch circuit member 65 and electrically connected with the lower wiring board 653 for emitting at least one first light beam B1. In this embodiment, the first light-emitting element 63 is a top-view light emitting diode.

The at least one light shade 64 is connected with the upper wiring board 651 of the membrane switch circuit member 65. Each light shade 64 has a light-outputting part 641. The first light beam B1 is shaded by the light shade 64. However, the first light beam B1 can be transmitted through the light-outputting part 641, and directed to the first light-outputting zone 6111. In this embodiment, the at least one light shade 64 and the upper wiring board 651 are integrally formed with each other. The at least one light shade 64 is produced by punching the partition plate 652 to form a convex structure. Moreover, the light-outputting part 641 of the light shade 64 is an opening.

Especially, in this embodiment, a reflective ink layer 67 is formed on a bottom surface 6514 of the upper wiring board 651. Due to the reflective ink layer 67, the upper wiring board 651 has the ability of reflecting the light beam. Since the upper wiring board 651 has the light-reflecting function, the at least one light shade 64, which is integrally formed with the upper wiring board 651, has the light-shading function without the need of opacifying the convex structure.

The backlight module 66 is disposed under the at least one first luminous key 61 and the plural second luminous keys 62 for emitting at least one second light beam B2 and allowing the at least one second light beam B2 to be transmitted through the at least one second light-outputting zone 6112 of the at least one keycap 611. In this embodiment, the at least one elastic element 612 is made of a light-transmissible plastic material, so that the at least one second light beam B2 can be transmitted through the at least one elastic element 612 and directed to the at least one second light-outputting zone 6112. In this embodiment, the backlight module 66 comprises at least one second light-emitting element 661 and another light shade 662. The at least one second light-emitting element 661 is disposed on the lower wiring board 653 and electrically connected with the lower wiring board 653 for emitting the at least one second light beam B2. In this embodiment, the second light-emitting element 661 is a side-view light-emitting diode.

In this embodiment, the partition plate 652 is also used as a light guide plate. Consequently, the at least one second light beam B2 is guided to the second light-outputting zone 6112 by the plural light-guiding structures 6522 of the partition plate 652. In this embodiment, the light-guiding structures 6522 are texturing structures. When the at least one second light beam B2 is emitted by the at least one second light-emitting element 661, the at least one second light beam B2 is introduced into the partition plate 652 through the plural light-guiding structures 6522, and transmitted to the plural light-transmissible zones 6512 of the upper wiring board 651. Consequently, the at least one second light beam B2 is sequentially transmitted through the membrane switch circuit member 65 and the at least one elastic element 612, and directed to the at least one second light-outputting zone 6112.

In the backlight module 66, the light shade 662 is connected with the membrane switch circuit member 65 for shading the at least one second light beam B2. In this embodiment, the light shade 662 and the upper wiring board 651 of the membrane switch circuit member 65 are integrally formed with each other. In an embodiment, the light shade 662 is produced by bending an edge 6513 of the upper wiring board 651 to form an additional convex structure. Since the upper wiring board 651 has the light-reflecting function, it is not necessary to opacify the additional convex structure. In other words, the light shade 64 and the light shade 662 are integrally formed with the upper wiring board 651.

In this embodiment, the lower wiring board 653 is also used as an additional reflector. The portion of the at least one second light beam B2 which is not transmitted through the plural light-guiding structures 6522 will be reflected by the lower wiring board 653. Consequently, the at least one second light beam B2 is introduced into the partition plate 652 again and directed to the second light-outputting zone 5112 through the plural light-guiding structures 6522. Under this circumstance, the utilization efficacy of the light beam is enhanced. On the other hand, since the upper wiring board 651 also has the light-reflecting function, the at least one second light beam B2 can be reflected by the upper wiring board 651. Under this circumstance, the utilization efficacy of the light beam is further enhanced.

From the above discussions, after the above components are combined together, the keyboard device 6 with the luminous key 61 is produced. Moreover, since the partition plate 652 can be used to replace the light guide plate and the lower wiring board 653 can be used to replace the additional reflector, it is not necessary to install the light guide plate and the additional reflector on the keyboard device 6 of this embodiment. Consequently, the overall height of the keyboard device 6 is reduced, and the design of this embodiment is helpful to meet the requirement of the light weightiness and slimness.

From the above descriptions, the present invention provides a keyboard device with a luminous key. The membrane switch circuit member and the light shade of the keyboard device are integrally formed with each other. Consequently, the light shade can be securely connected with the membrane switch circuit member. Under this circumstance, the possibility of detaching the light shade is minimized, and the illuminating efficacy of the luminous key is not impaired. Moreover, due to the arrangement of the light shade, the first light beam and the second light beam are properly isolated from each other without being mixed. Consequently, the illuminating efficacy of the luminous key is further enhanced. Moreover, since some parts of the membrane switch circuit member of the keyboard device may be used to replace the light guide plate and the additional reflector, the overall height and the overall volume of the keyboard device are both reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A keyboard device, comprising:

at least one luminous key exposed to a top surface of said keyboard device, wherein each of said at least one luminous key has a first light-outputting zone;

a membrane switch circuit member disposed under said at least one luminous key, wherein when said membrane switch circuit member is triggered by said at least one luminous key, said membrane switch circuit member generates at least one luminous key signal, wherein said membrane switch circuit member comprises:

an upper wiring board having at least one upper contact:

a partition plate disposed under said upper wiring board, and having at least one first perforation corresponding to said at least one upper contact, wherein when said membrane switch circuit member is depressed, said at least one upper contact is inserted into said at least one first perforation; and a lower wiring board disposed under said partition plate, and having at least one lower contact corresponding to said at least one upper contact, wherein said at least one upper contact and said at least one lower contact are collectively defined as said at least one key intersection;

at least one first light-emitting element disposed under said at least one luminous key for emitting at least one first light beam, wherein said at least first light beam is directed to said corresponding first light-outputting zone;

a first light shade connected with said membrane switch circuit member, and disposed under said at least one luminous key for shading said at least first light beam, wherein said first light shade and said membrane switch circuit member are integrally formed with each other; and a backlight module, which is disposed under said at least one luminous key for emitting at least one second light beam, wherein said at least one second light beam is directed to a second light-outputting zone of said at least one luminous key, wherein said backlight module comprises:

a flexible circuit board with said membrane switch circuit member;

at least one second light-emitting element disposed on said flexible circuit board for emitting said at least one second light beam, wherein said at least one second light beam is directed to said membrane switch circuit member; and a second light shade connected with said membrane switch circuit member for shading said at least one second beam, wherein said second light shade and said membrane switch circuit member are integrally formed with each other.

2. The keyboard device according to claim 1, wherein said first light shade is produced by punching said upper wiring board to form a convex structure and opacifying said convex structure, wherein said upper wiring board has a third perforation, and said first light shade is inserted into said third perforation, wherein said at least one light-emitting element is disposed on said lower wiring board.

3. The keyboard device according to claim 2, wherein said first light shade has a light-outputting part, wherein said at least first light beam is shaded by said first light shade, but said at least first light beam is permitted to be transmitted through said corresponding light-outputting part and directed to said first light-outputting zone.

4. The keyboard device according to claim 3, wherein said at least one light-emitting element is a top-view light-emitting element, and said light-outputting part is an opening or a light-transmissible zone.

5. The keyboard device according to claim 1, wherein said second light shade is produced by bending an edge of said partition plate to form a convex structure, wherein said at least one second light-emitting element is a side-view light-emitting element.

6. The keyboard device according to claim 1, wherein said lower wiring board further comprises plural light-guiding structures, wherein said plural light-guiding structures are formed on a bottom surface of said lower wiring board for guiding said at least one second light beam to said second light-outputting zone, wherein said partition plate is a reflector with said at least one first perforation, or a reflective ink layer is formed on a top surface or a bottom surface of said partition plate, so that said at least one second light beam is reflected by said partition plate, wherein said partition plate further comprises plural second perforations, and said at least one second light beam is transmitted through said plural second perforations, wherein each of said light-guiding structures is a V-cut microstructure, a texturing structure or a light-guiding ink layer.

7. The keyboard device according to claim 1, wherein said backlight module further comprises a reflector, wherein said reflector is disposed under said lower wiring board for reflecting said at least one second light beam, so that said at least one second light beam is directed to said second light-outputting zone through plural light-guiding structures of said lower wiring board, wherein each of said light-guiding structures is a V-cut microstructure, a texturing structure or a light-guiding ink layer.

8. The keyboard device according to claim 1, wherein said first light shade is produced by punching said upper wiring board to form a convex structure and opacifying said convex structure, wherein said at least one light-emitting element is disposed on said partition plate or said lower wiring board.

9. The keyboard device according to claim 8, wherein said first light shade has a light-outputting part, wherein said at least first light beam is shaded by said first light shade, but said at least first light beam is permitted to be transmitted through said corresponding light-outputting part and directed to said first light-outputting zone.

10. The keyboard device according to claim 9, wherein said at least one light-emitting element is a top-view light-emitting element, and said light-outputting part is an opening or a light-transmissible zone.

11. The keyboard device according to claim 1, wherein said second light shade is produced by bending an edge of said partition plate to form a convex structure, and said convex structure is not opacified, wherein said at least one second light-emitting element is a side-view light-emitting element.

12. The keyboard device according to claim 11, further comprising a reflector, which is disposed under said lower wiring board for reflecting said at least first light beam, so that said at least first light beam is directed to said first light-outputting zone through plural light-guiding structures of said lower wiring board, wherein each of said light-guiding structures is a V-cut microstructure, a texturing structure or a light-guiding ink layer.

13. A keyboard device comprising:

at least one luminous key exposed to a top surface of said keyboard device, wherein each of said at least one luminous key has a first light-outputting zone;

a membrane switch circuit member disposed under said at least one luminous key, wherein when said membrane switch circuit member is triggered by said at least one luminous key, said membrane switch circuit member generates at least one luminous key signal, wherein said membrane switch circuit member comprises:

an upper wiring board having at least one upper contact;

a partition plate disposed under said upper wiring board, and having at least one first perforation corresponding to said at least one upper contact, wherein when said membrane switch circuit member is depressed, said at least one upper contact is inserted into said at least one first perforation; and a lower wiring board disposed under said partition plate, and having at least one lower contact corresponding to said at least one upper contact, wherein said at least one upper contact and said at least one lower contact are collectively defined as said at least one key intersection;

at least one first light-emitting element disposed under said at least one luminous key for emitting at least one first light beam, wherein said at least first light beam is directed to said corresponding first light-outputting zone;

a first light shade connected with said membrane switch circuit member, and disposed under said at least one luminous key for shading said at least first light beam, wherein said first light shade and said membrane switch circuit member are integrally formed with each other; and a backlight module, which is disposed under said at least one luminous key for emitting at least one second light beam, wherein said at least one second light beam is directed to a second light-outputting zone of said at least one luminous key, wherein said backlight module comprises:

at least one second light-emitting element disposed on said partition plate or said lower wiring board for emitting said at least one second light beam, wherein said at least one second light beam is directed to said partition plate or said lower wiring board; and a second light shade connected with said upper wiring board for shading said at least one second beam, wherein said second light shade and said upper wiring board are integrally formed with each other.

14. The keyboard device according to claim 13, wherein said second light shade is produced by bending an edge of said upper wiring board to form a convex structure, wherein said at least one second light-emitting element is a side-view light-emitting element.

15. The keyboard device according to claim 13, wherein said partition plate further comprises plural light-guiding structures, wherein said plural light-guiding structures are formed on a bottom surface of said partition plate for guiding said at least one second light beam to said second light-outputting zone, wherein said upper wiring board is a reflector with said at least one upper contact, or a reflective ink layer is formed on a top surface or a bottom surface of said upper wiring board, so that said at least one second light beam is reflected by said upper wiring board, wherein said upper wiring board further comprises plural second perforations, and said at least one second light beam is transmitted through said plural second perforations, wherein each of said light-guiding structures is a V-cut microstructure, a texturing structure or a light-guiding ink layer.

16. The keyboard device according to claim 13, wherein said lower wiring board is a reflector with said at least one lower contact, or a reflective ink layer is formed on a top surface or a bottom surface of said lower wiring board, so that said at least one second light beam is reflected by said lower wiring board and said at least one second light beam is directed to said second light-outputting zone through plural light-guiding structures of said partition plate.

17. The keyboard device according to claim 13, wherein said lower wiring board further comprises plural light-guiding structures, wherein said plural light-guiding structures are formed on a bottom surface of said lower wiring board for guiding said at least one second light beam to said second light-outputting zone, wherein said partition plate is a reflector with said at least one first perforation or a reflective ink layer is formed on a top surface or a bottom surface of said partition plate, so that said at least one second light beam is reflected by said partition plate, wherein said partition plate further comprises plural second perforations, and said at least one second light beam is transmitted through said plural second perforations, wherein each of said light-guiding structures is a V-cut microstructure, a texturing structure or a light-guiding ink layer.

* * * * *